Sept. 28, 1943. O. H. BANKER 2,330,198
REVERSING GEAR
Filed July 10, 1941 2 Sheets-Sheet 1
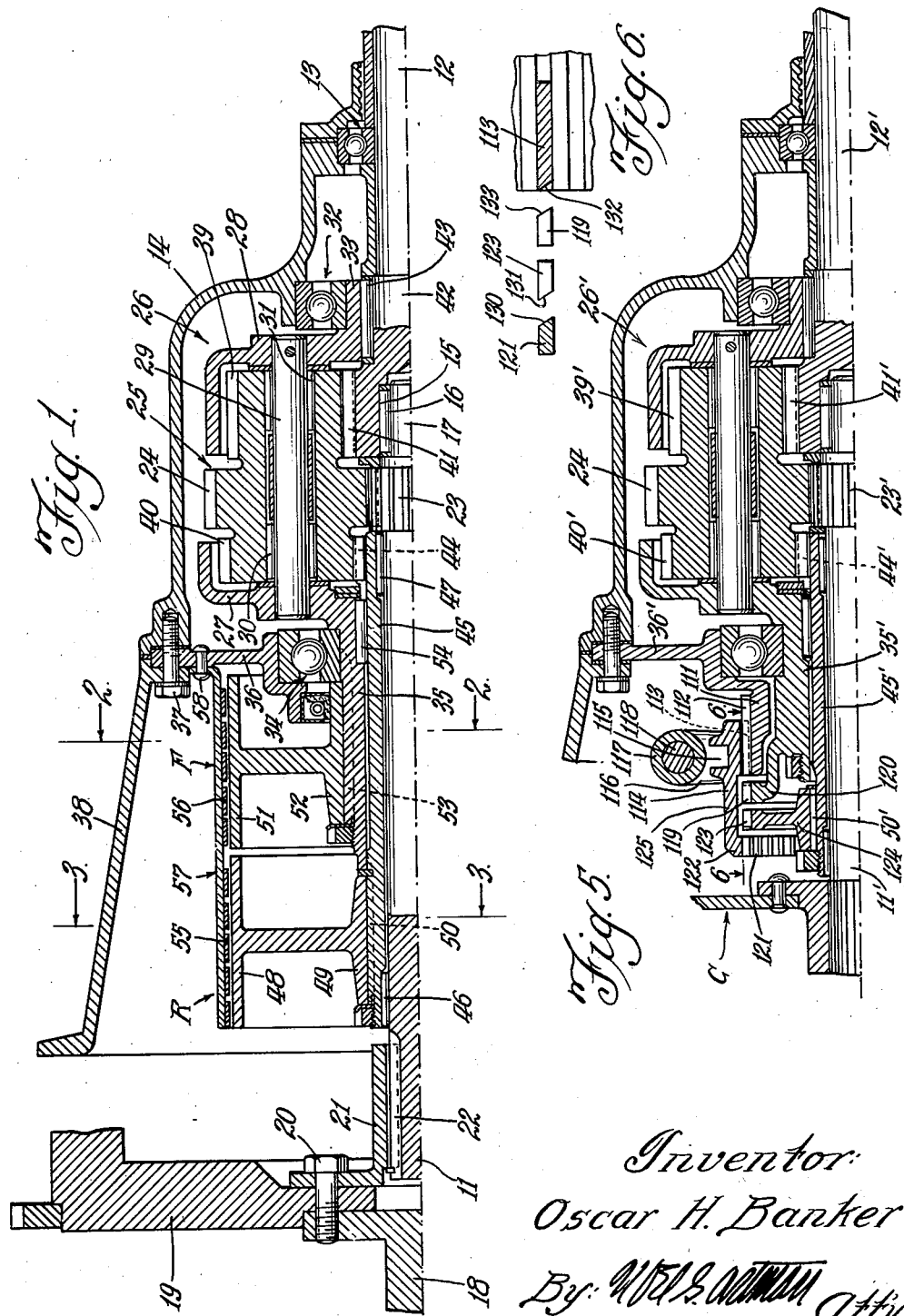
Inventor
Oscar H. Banker Sept. 28, 1943.  O. H. BANKER  2,330,198
REVERSING GEAR
Filed July 10, 1941   2 Sheets-Sheet 2
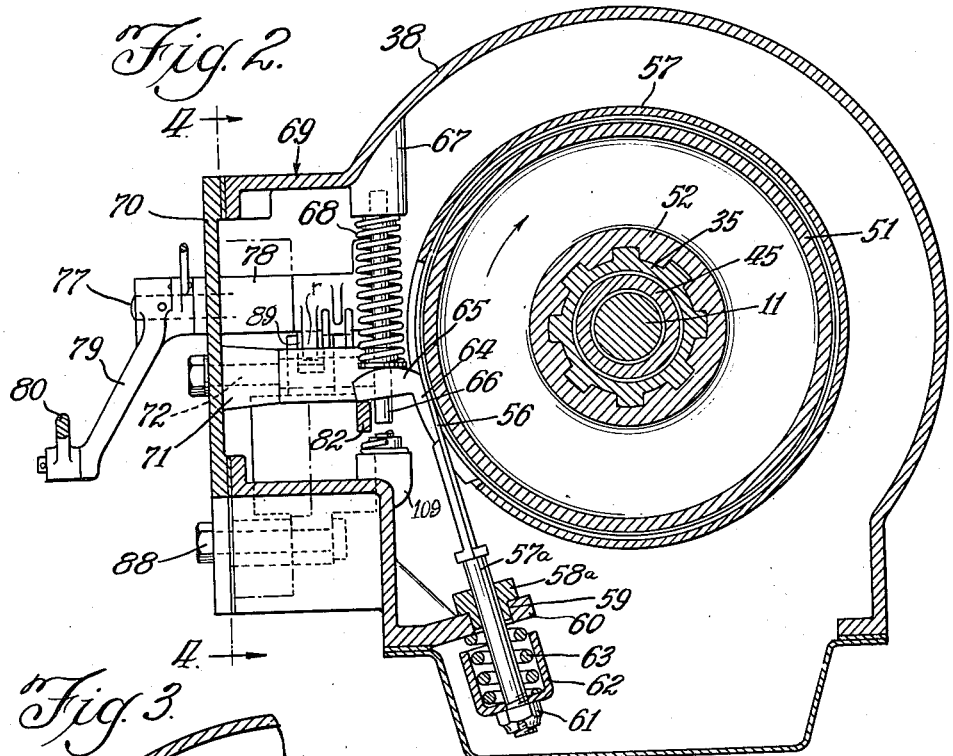
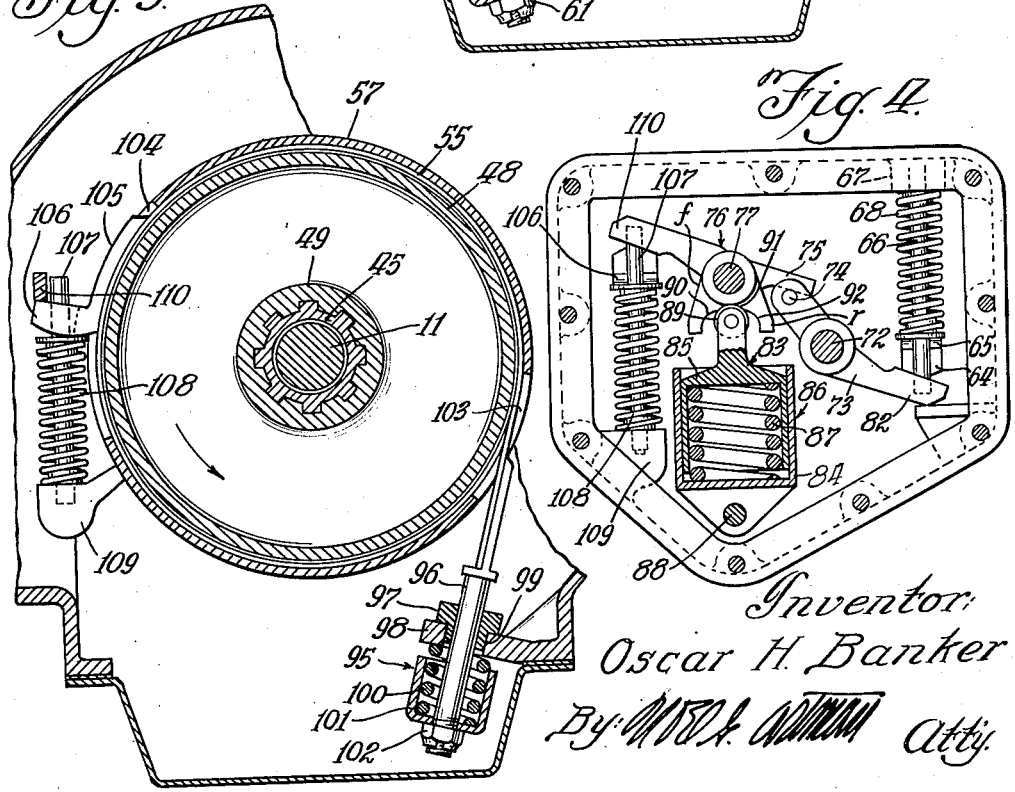
Inventor:
Oscar H. Banker Patented Sept. 28, 1943

2,330,198

UNITED STATES PATENT OFFICE 2,330,198

REVERSING GEAR

Oscar H. Banker, Evanston, Ill., assignor to New Products Corporation, Chicago, Ill., a corporation of Delaware Application July 10, 1941, Serial No. 401,719

1 Claim. (Cl. 74—271)

This invention relates generally to speed reduction reversing gear units and has to do more particularly with an improved planetary gear arrangement together with clutches selectively operable to condition the apparatus for forward or reverse drive of a driven shaft. Apparatus constructed according to the present invention is particularly adapted for installation in the driving connection between the power plant and the propeller of engine-driven marine craft, although it is not curtailed to such use.

An important object of the present invention is the provision of an improved quiet running reversing gear of the planetary type together with clutch means disengageable to disrupt all driving connections between drive and driven shafts, thus placing the gear in neutral, and alternatively engageable to hold respective parts from rotation to obtain forward drive of the driven shaft when one of these parts is so held and to obtain reverse drive of the driven shaft upon such holding of the other of these parts.

Another object of the invention is the provision of a reversing gear as the above wherein the clutches are of a character adapting them to gradually bring their respectively associated gear parts to a stop, whereby a quick change can be made from either driving connection to the other while the gear is in operation.

An object corollary to that next preceding is the provision of a reversing gear unit requiring no main or disconnect clutch between its drive shaft and the power source.

A further object of this invention is the provision of a reversing gear according to the first recited object and employing jaw clutches in the creation of an effective economically produced structure.

Still a further object is the provision of a reversing gear wherein the aforesaid jaw clutches are of the overrunning type to expedite synchronization and meshing of their counterparts.

These and other desirable objections inherent in and encompassed by the invention will be fully understood from the ensuing description together with the disclosure in the drawings, wherein:

Fig. 1 is a vertical sectional view taken axially through the upper half of reversing gear apparatus constructed in accordance with the present invention;

Fig. 2 is a transverse sectional view taken through the apparatus for illustrating a clutch and clutch control therefor, the view being taken as indicated by the line 2—2 in Fig. 1;

Fig. 3 is a view like Fig. 2, illustrating a second clutch and clutch control, this view being taken as indicated by the line 3—3 in Fig. 1;

Fig. 4 is an elevational view partly in section and showing part of the control mechanism for the clutches shown in Figs. 1, 2, and 3, this view being taken upon the line 4—4 in Fig. 2;

Fig. 5 is a view like Fig. 1 showing a modified embodiment of the invention; and Fig. 6 is a fragmentary view partly in section illustrating chamfering of the teeth in overrunning jaw clutches employed in the apparatus of Fig. 5.

The first form of the invention, as clearly shown in Fig. 1, includes coaxial drive and driven shafts 11 and 12. The driven shaft has a rear portion journalled within a ball-bearing unit 13 supported within the back end of a gear box 14 in which the gears of the apparatus are enclosed. The front end of the driven shaft 12 is enlarged and contains a recess with a cylindrical side wall forming a race 15 for a set of needle bearings 16 (one being shown in Fig. 1) which rotatively carry a reduced back end section 17 of the drive shaft 11.

There is shown in association with the front end of the drive shaft 11 a back end portion of a shaft 18 such as the crankshaft of an internal combustion engine from which the drive shaft is to be driven. There is bolted to this shaft 18 the usual flywheel 19, and the bolts 20 which connect the flywheel with the crankshaft also serve to connect the flange portion of a coupling member 21 with the shaft 18. A splined driving connection 22 exists between the coupling member 21 and the front end portion of the drive shaft 11 whereby this shaft is fixed for rotation with the shaft 18.

A drive sun gear 23 is formed integrally with a back end portion of the drive shaft 11, this gear 23 being mutually meshed with the center gears 24 in each of a plurality of planet gear clusters 25, of which one is shown in Fig. 1. These planet gear clusters 25 constitute a part of a planetary gear unit in which there is a planet gear carrier 26 comprising a forward carrier plate 27, a rear carrier plate 28, and a plurality of shafts 29 interconnecting the plates 27 and 28 and serving as spindles upon which the gear clusters 25 are respectively rotatively mounted. Sets of needle bearings 30 and 31 may be provided between each gear cluster 25 and its associated shaft 29 for minimizing friction. While only one gear cluster 25 is shown in the drawings, those skilled in the art understand that the generally disc shaped carrier plates 27 and 28 support in circumferentially spaced relation thereabout, a plurality of the shafts 29 and gear clusters 25, and that normally the planet gear carrier is reinforced by members (not shown) disposed between the gear clusters 25 and connected with each of the plates 27 and 28. The carrier is therefore a rigid fabricated unit.

Said carrier 26 is journalled in the gearbox for rotation coaxially of the shafts 11 and 12, there being a ball-bearing unit 32 mounted in a back end portion of the gearbox for rotatively supporting the back end of the carrier by means of a flanged portion 33 integral with the end plate 28, and another ball-bearing unit 34 supports the front end of the planet carrier at the root of a sleeve shaft member 35 extending forwardly from the hub of the carrier plate 27. The ball-bearing unit 34 is supported in a transverse wall 36 of the gearbox 14 and a series of bolts 37, of which one is shown in Fig. 1, secure the wall 36 upon the gearbox 14, as well as a bell housing 38 here considered as part of the gearbox.

Referring again to the gear clusters 25, each of these comprises a relatively small diameter gear 39 and an intermediate diameter gear 40 in addition to the aforesaid gear 24, each of the gears 39 consisting of one of a set meshed with a driven sun gear 41 formed integrally with the enlarged back end portion of the driven shaft 12. It will be noted that a slightly enlarged section 42 of the driven shaft is journalled upon a set of needle bearings 43, which ride within the inner periphery of the hub flange 33 of the carrier plate 28.

The planet gears 40 constituting a forward gear set each mesh with a reaction sun gear 44 which is integral with a sleeve shaft 45 that is journalled coaxially about the drive shaft 11 where it rides upon sets of needle bearings 46 and 47 near opposite of its ends. Means for selectively holding the sleeve shaft 45 and hence the reaction sun gear 44 against rotation, or for permitting these parts to rotate freely includes a clutch R wherein there is a clutch drum 48 of which the hub 49 is splined to the sleeve shaft 45 at 50. Means for frictionally engaging the clutch drum 48 for holding the same against rotation will be described presently.

A second clutch F, is for selectively holding the planet carrier 26 against rotation, or for permitting the same to rotate freely and comprises a clutch drum 51 of which the hub 52 is splined at 53 to the sleeve shaft 35. This latter sleeve shaft contains a set of needle bearings 54 which rotatively carry the sleeve shaft 45.

Clutch R is the reverse drive clutch since it is effective (when engaged) to condition the apparatus for driving the driven shaft reversely with respect to the drive shaft, whereas clutch F is the forward drive clutch since it is effective (when engaged) to condition the apparatus for driving the driven shaft in the same direction as the drive shaft.

Apparatus for selectively engaging the clutches R or F by clutching the clutch drums 48 and 51 to the gear box is shown in Figs. 2, 3 and 4. This apparatus includes a spirally wound metallic band 55 of which the convolutions normally spacedly circumscribe the outer periphery of the drum 48, and a similar spirally wound band 56 disposed in like manner with respect to the clutch drum 51. Cross-sectional portions in the various convolutions of the strips 55 and 56 are shown in Fig. 1 and there is also shown in Fig. 1, and in Figs. 2 and 3, a cylindrical guard member 57 for encasing the spirally wound strips 55 and 56. A flanged end section of the member 57 is anchored to the casing wall 36 by a plurality of rivets 58. These spirally wound brake members 55 and 56 are resilient and thus have a tendency to expand outwardly into engagement with the guard member 55, out of engagement with the clutch drums 48 and 51 as illustrated in Fig. 1.

In Fig. 2 the clutch band 56 will be seen to have upon its rearmost end a cylindrical anchorage member 57a slidable endwise within a bushing 58a which is suitably secured within an opening 59 of a bell housing flange 60. The lower end of the cylindrical member 57a is threaded to receive a nut 61 which controls the axial position of a spring cup 62 containing a helical spring 63 surrounding the cylindrical member 57a. Beginning with the end of the band 57 that is connected with the anchorage member 57a, and as viewed in Fig. 2, this band is wound clockwise to effect its several convolutions about the drum 51, and the opposite end of said band has secured thereto a terminal member 64 upon which there is an apertured stud 65 which receives and is reciprocal vertically upon a guide rod 66 anchored at its upper end in a boss 67 formed integrally with the bell housing. A helical expansion spring 68 is disposed about the rod 66 between said boss and the apertured stud 65 for normally holding the stud 65 downwardly in the position shown in Fig. 2 and thus maintaining the band 56 loosened with respect to the clutch drum 51.

Control means for the engagement and disengagement of the clutch band 56 with the drum 51 is contained in a side wall compartment 69 of the bell housing and having a side wall opening closed by a cover plate 70. This cover plate is provided with a boss 71, Fig. 2, in which there is anchored a headed pivot post 72, Figs. 2 and 4, upon which a lever 73 is rotatively carried. The upper end of this lever as seen in Fig. 4 is provided with a pin 74 engaged by an end portion 75 of a second lever 76, which is secured non-rotatively to a control shaft 77. In Fig. 2 the control shaft 77 is shown mounted for rotation in a cover plate boss 78 and there is also shown in Fig. 2, exteriorly of the cover plate 70, a control arm 79 non-rotatively fixed to the shaft 77 and operable by control linkage including a link 80 for causing rotation of the control shaft.

Assuming that a force is applied to the planet carrier 26 for causing the same to rotate clockwise, as viewed from the back end of this apparatus, that is, from the right end as shown in Fig. 1, wherefor the clutch drum 51 which is connected with the carrier through the sleeve shaft 45, is caused to rotate clockwise as viewed in Fig. 2; and further assuming that an upward force is applied to the apertured stud 65 secured to the foremost end of the spirally wound clutch band 56, the diameter of the convolutions in this band will be diminished for causing the band to contract upon the drum 51 for frictionally engaging the same. Since the convolutions of the clutch bend progress in the same circumferential direction from its anchorage in the flange 60 as the clutch drum rotates or has a tendency to rotate there will be a servo action tending to draw the band more tightly about the drum, whereby the latter is securely snubbed to the gear box. Severe shock or jar resulting from this snubbing action is precluded by the spring 63, which permits limited rotational advance of the clutch band with the clutch drum 51. The distance the band 56 can move rotatively with the clutch drum 51 is determined by the spring cup 62 when the latter abuts the lower edge of the flange 60.

Upward displacement of the apertured stud 65 upon the forward or so-called unanchored end of the clutch band 56 against the force of the spring 68 is brought about by effecting clockwise rotation of the control shaft 77, as the latter is viewed in Fig. 4. Such rotation of the control shaft effects like rotation of the lever 76 whereby its right end 75 moves the pin 74 in lever 73 downwardly, causing counterclockwise rotation of this lever, whereby its right end 82 (also viewable in Fig. 2) is carried upwardly against the stud 65 to displace it upwardly in the aforesaid manner.

A toggle device 83, is provided for holding the levers 76 and 73 in their just described rotational positions to maintain the spring 68 compressed and the clutch band 56 in clutching relation with the drum 51. The toggle device comprises a pair of telescopically associated open-ended cup members 84 and 85 which form a housing 86 for a helical expansion spring 87. The cup member 84 is pivotally mounted upon a stud 88 which is anchored in the cover plate 70, whereas the end wall of the cup 85 has an extension in which there is journalled a roller 89 that is adapted to roll along the hub portions of the lever 76 into registry with any one of three seats therefor, respectively designated 90, 91 and 92. The roller 89 is shown in association with the seat 91 which may be termed a neutral seat for when this seat is in registry with the roller 89, neither of the clutch bands 55 or 56 will be in clutching relation with their clutch drums. Said spring 87 is held under compression between the ends of the spring cups 84 and 85, whereby the roller 89 is pressed firmly against the seat with which it happens to be in registry while the device 83 bears reactively downwardly upon the pivotal mounting 88. It will be understood therefore that when the control shaft 77 and the lever 76 are rotated clockwise, as described above, for causing contraction of the clutch band 56 onto the drum 51, the hub portion of the lever 76 will be so tilted that the roller 89 will shift from the seat 91 into the seat 90 incident to slight expansion of the spring 87, wherefore the device 83 will prevent clockwire rotation of the finger *f* and of the lever 76 under the expansive force of the then compressed spring 68. Thus, the forward clutch F will remain engaged until the control shaft 77 is rotated counter-clockwise for replacing the parts into the position illustrated in Fig. 4. When this occurs, the spring 68 will force the apertured stud 65 downwardly for loosening the clutch band 56 and freeing the clutch drum 51, so the planet carrier 26 can rotate freely.

A yieldable anchorage for the helical clutch band 55 is shown at 95 in Fig. 3. This anchorage includes a rod-like member 96 to which one end of the band 55 is secured, a bushing 97 in which the member 96 is reciprocal, a bell housing flange 98 having an aperture 99 in which the bushing is disposed, a spring 100 disposed between the under side of the flange 98 and the lower closed end of a spring cup 101, and a nut 102 turned upon the lower threaded end of the member 96. From the member 96, as viewed in Fig. 3, the band 55 progresses counterclockwise about the drum 48, there being an opening 103 in the cylindrical guard member 57 through which the band 55 enters said guard member, and an opening 104 through which the opposite or so-called free end of the band is accessible. The free end of the band 55 is provided with a terminal member 105 on which there is a stud 106 having an opening through which there projects a guide stem 107 about which there is an expansion spring 108. The lower end of the spring 108 rests upon a boss 109, shown in both Figs. 3 and 4. An end portion 110 of the control lever 76 is adapted to be moved downwardly against the flange 106 for tightening the band 55 upon the drum 48, and when this drum is rotating counter-clockwise as viewed in Fig. 3, the frictional engagement of its periphery with the band convolutions will supplement the force of the lever 76 by servo action, the spring 108 being compressed incident to this clutch closing operation, and the drum 48 being eventually snubbed and held against rotation. Sudden jerking in the application of the clutch band 55 is prevented by the anchorage spring 100 which acts similarly to the spring 62 in Fig. 2, as above described.

When the control lever 76 is rotated counter-clockwise, Fig. 4, to carry the lever end section 110 downwardly for tightening the clutch band 55 and incidentally compressing the spring 108 as aforesaid, the hub portion of the lever 76 will also be rotated counter-clockwise, thereby displacing the finger *r* and the seat 92 therein counter-clockwise from the position shown in Fig. 4, whereby the roller 89 of the toggle device is caused to roll into said seat for maintaining the spring 108 compressed and the clutch band 55 applied in clutching relation with the clutch drum 48. Release of the clutch R is subsequently effected at will by rotating the control shaft 77 and the parts carried thereby clockwise into the position shown in Fig. 4, whereupon the toggle device will cause the roller 89 to snap into the neutral seat 91, the end portion 110 of the lever 76 then being removed from the terminal member 105 upon the free end of the clutch band to permit this end of the clutch band to be moved upwardly by the spring 108, thus loosening the band from the clutch drum and permitting the same to rotate freely.

As explained hereinabove, the present apparatus is conditionable for causing the driven shaft 12 to rotate forwardly, that is, in the same direction as the drive shaft 11 at reduced speed with respect to the drive shaft, or is alternatively conditionable to effect a driving connection between the drive and driven shafts by means of which the driven shaft will be rotated reversely at reduced speed. The apparatus is also settable in a neutral condition in which there is no driving connection established between the drive and driven shafts so that the motor (not shown) connected with the drive shaft can be run at any speed without incurring the transmission of power to the driven shaft 12. The apparatus is set for establishing the forward drive connection when the clutch F is closed and is set for the reverse drive connection when the clutch R is closed. When neither of the clutches R and F is closed, the apparatus will be in neutral.

In the operation of this apparatus, assuming the drive shaft 11 to be rotated conventionally counter-clockwise as viewed from the back end, and further assuming the driven shaft 12 to be at rest because of a load connected therewith, such as a submerged propeller, the sun gear 23 rotating with the drive shaft will be rotating the gear clusters 25, whereby the planet gears 39 will be rolling clockwise about the toothed periphery of the sun gear 41. This orbital movement of the planet gear clusters about the sun gear 41 causes the planet carrier 26 to rotate clockwise, the parts still being regarded as viewed from their back ends. Therefore the clutch drum 51 which is connected with the carrier 26 through the sleeve shaft 35 will also be rotating clockwise as indicated by the arrow in Fig. 2.

Now in connecting the apparatus for driving the driven shaft 12 forwardly or counter-clockwise as viewed from its back end, the control shaft 77 will be rotated clockwise, Fig. 4, to cause contraction of the clutch band 56 upon the clutch drum 51 in the above described manner, whereby this clutch drum and the planet carrier 26 will decelerate to zero speed and become clutched to the gear box and thus held against rotation. During this deceleration of the planet carrier 26 to zero speed, force will be transmitted through the gears 23, 24, 39 and 41 to the driven shaft to accelerate this shaft counter-clockwise or in the forward direction. It will be seen, therefore, when the planet carrier eventually comes to rest, that the gear clusters 25 simply operate as countershafts, causing the shaft 12 to rotate in the same direction as the drive shaft but at reduced speed because of the difference in ratio of the gears 23 and 24 with respect to the gears 39 and 41.

When it is desired to reverse the rotation of the driven shaft 12, the control shaft 77 will be rotated counter-clockwise through the neutral position shown in Fig. 4 and to the position in which the end section 110 of the lever 76 will be operable for pressing the free end of the clutch band 55 downwardly and thus engaging the clutch R. Pursuant to this rotation of the shaft 77, the spring 68 will first be operable for releasing the forward drive clutch band 56. Meanwhile the planet gears 40 will have been rotating the sun gear 44, the sleeve shaft 45, and the clutch drum 48 counter-clockwise, as viewed in Fig. 3, and as the clutch R is being closed this drum will be decelerated and ultimately secured to the gear box so that rotation entirely ceases. When the apparatus is thus conditioned, forward or counter-clockwise rotation of the sun gear 23, as viewed from the back end of the apparatus, will cause the planet gears 40 to roll about the toothed periphery of the non-rotating reaction sun gear 44, this now being possible since the planet carrier is no longer held from rotation by the clutch band 56. Hence the planet gears 39 are then carried orbitally about the axes of the shafts 11 and 12, and, because of the interlocking of their teeth with the teeth upon the driven sun gear 41, this sun gear and the driven shaft will be carried clockwise therewith. However, since the gears 39 will then be rotating clockwise about their individual axes the sun gear 41 will not be rotated as fast as the orbital movement of the planet gears or as the rate of rotation of the planet carrier, but since the planet gears 39 are of less diameter then the planet gears 40 their peripheral speed will be less than that of the gears 40 so the sun gear 41 will be rotated clockwise at slow speed. The effect of this driving connection through the transmission apparatus is therefore to cause the driven shaft 12 to rotate reversely with respect to the drive shaft 11 and at a reduced speed.

That embodiment shown in Figs. 5 and 6 is like that shown in the lower numbered figures with the exception that the drive shaft 11' thereof, corresponding to the shaft 11, is connected with a prime mover through a clutch (of which a driven part is indicated at C), and in the further respect that jaw clutch means instead of frictional clutch means is employed for connecting the sleeve shafts 35' and 45', respectively corresponding to the sleeve shafts 35 and 45, to the gear box. The clutch of which the member C is a part may be a manually operated friction clutch, a fluid coupling, an automatic speed responsive clutch, or any other type of clutch.

The description of this second embodiment is expedited by designating those parts that correspond to parts in the above described embodiment by the same respective reference characters but with a prime added.

In this second embodiment, the transverse wall member 36' is provided with a cylindrical forward extension 111 on which there are exterior axially directed splines 112. These splines 112 are meshed with splines 113, which serve as jaw clutch teeth, upon the inner periphery of a clutch ring 114. This ring, which is axially slideable upon the extension 111, has a circumferential groove 115 wherein there are disposed shoes (not shown) carried in the ends of the legs 116 of a shifter fork 117. The shifter fork is secured non-rotatively to a control shaft 118 and it will be understood that, because of the aforesaid shoes (not shown) riding in the groove 115, the clutch ring 114 may be shifted either forwardly or backwardly from the position shown in Fig. 5 by rotating the control shaft 118, clockwise or counter-clockwise.

When the clutch ring 114 is shifted forwardly the clutch teeth 113 therein are adapted to mesh with teeth 119 projecting radially from a circular jaw clutch counterpart 120 while maintaining their meshed relation with the splines 112 and thereby connect said clutch counterpart 120, and the sleeve shaft 35', and the planetary carrier 26' non-rotatively with the gear box. Clutch teeth 121 projecting inwardly with respect to their circular arrangement about a clutch counterpart 122 upon the clutch ring 114 are adapted to mesh with teeth 123 about the peripheral edge of a disc-like clutch counterpart 124 splined to the sleeve shaft 45' at 50' when the clutch ring 114 is shifted axially rearwardly or to the right from the position shown in Fig. 5. When the clutch counterparts 122 and 124 are in meshed relation, the sleeve shaft 45' and the reaction sun gear 44' will be connected non-rotatively to the gear box for establishing the reverse drive connection. A bridging section 125 of the clutch ring 114 has sufficient internal diameter for enabling it to clear the clutch counterparts 120 and 124 when this clutch ring is in the neutral position shown in Fig. 5.

In connecting the apparatus for forward drive, that is, for driving the driven shaft 12' in the same direction as the drive shaft 11', the control shaft 118 will be rotated clockwise, as viewed in Fig. 5, for shifting the clutch ring 114 forwardly for meshing the clutch teeth 113 with the clutch teeth 119 and thus establishing the forward drive connection hereinabove explained. When this connection is established, the operator will connect the drive shaft 11' with the craft engine and this is done in the case of a manually actuated clutch by releasing the clutch pedal, and in the case of a speed responsive clutch simply by accelerating the engine to a speed at which the clutch engages. In conditioning the apparatus for driving the driven shaft 12' reversely, the clutch ring 114 will be shifted backwardly for meshing the counterparts 122 and 124 and thereafter causing engagement of the clutch at C. The apparatus functions through this driving connection in the manner explained hereinabove with respect to the first embodiment.

While operating the apparatus through the forward speed connection, that is, while the clutch counterpart 120 and the planet carrier 26' are connected non-rotatively with the gear box, the sleeve shaft 45' and the clutch counterpart 124 splined thereto will be caused to rotate counterclockwise, as viewed from their rear ends. Because of this direction in rotation of the counterpart 124 relatively to the counterpart 122, which is at rest, I have beveled the opposed end faces of the clutch teeth 121 and 123, as shown at 130 and 131 in Fig. 6 to facilitate their ratcheting together incident to a quick shift from the forward drive connection to the reverse drive connection. Such a change from forward to reverse will involve closing of the engine throttle and declutching of the clutch teeth 113 from those of the clutch counterpart 120 whereupon the drive shaft 11' will normally decelerate more rapidly, due to engine compression, than the driven shaft 12' due to the movement of the craft through the water and the action of the latter upon the propeller. Because of this deceleration of the drive shaft 11' and of the gear 23', the planet gears 40' will decrease the speed at which they drive the sleeve shaft 45' and the clutch counterpart 124 in the counter-clockwise direction. Eventually these parts 45' and 124 will be decelerated to zero speed to synchronize with the clutch counterpart 122, whereupon the latter can be moved rearwardly into mesh with the counterpart 124. Meanwhile, because of the beveled end faces 130 and 131 upon the clutch teeth 121 and 123, the operator can have been pressing the teeth 121 into ratcheting relation with the teeth 123, thereby braking the clutch counterpart 124 for shortening its deceleration period and for causing the teeth 121 to mesh with the teeth 123 at the very instant of synchronization.

Beveling of the opposed end faces upon the clutch teeth 113 and 119 at 132 and 133 is provided as illustrated in Fig. 6 to similarly expedite the shift from reverse drive to forward drive. During operation of the apparatus through the reverse drive connection, the planet carrier 26' and the clutch counterpart 120 will be rotating reversely or clockwise, as viewed from the rear. The shift from reverse to the forward drive connection will involve closing of the engine throttle for terminating the transmission of driving force through the drive shaft 11' and will also involve shifting of the clutch ring 114 forwardly for demeshing the clutch teeth 122 and 123. This shift will further involve deceleration of the clutch counterpart 120 to zero speed, and it will be understood that during this synchronization period the beveled faces 132 and 133 upon the clutch teeth 113 and 119 will enable the operator to press the teeth 113 forwardly into ratcheting relation with the teeth 119 for shortening the deceleration period by braking action thereon and to enable the operator to cause these teeth to mesh at the instant of their synchronization.

While I have herein shown and described but two specific embodiments, it should be understood that the invention extends to other arrangements, details and structures falling within the spirit thereof.

I claim:

A reversing gear unit comprising; a planetary gear unit which includes a planetary gear carrier journalled for rotation about its principal axis and having front and back ends, forward, back and intermediate sets of planet gears in said carrier, the gears in each set being journalled for rotation in fixed coaxial relation with respective gears in the other of such sets, the gears in the intermediate set being relatively large in diameter, those in the back set being relatively small in diameter while those in the forward set are of intermediate diameter, a reaction sun gear meshed with the forward gears, a drive sun gear meshed with the intermediate gears, and a driven sun gear meshed with the back gears; drive and driven shafts disposed in end-to-end relation coaxially with the carrier and the sun gears and respectively fixed for rotation with the drive and driven sun gears; sleeve shafts rotatively fixed respectively with said reaction sun gear and with the planet carrier and projecting forwardly therefrom in concentric relation about the drive shaft; clutch drums respectively fixed non-rotatively with said sleeve shafts and juxtaposed axially thereof; brake bands spirally wrapped in opposite directions respectively about the peripheries of said drums, one end of each of said bands being anchored and the opposite ends thereof being displaceable oppositely for tightening said bands upon their drums; and control means operably associated with said opposite ends of the bands and actuatable in one direction for displacing the end of one band in the band-tightening position and in the opposite direction for displacing the end of the other band in the band-tightening position.

OSCAR H. BANKER.